United States Patent
Chen (10) Patent No.: US 10,326,374 B2
(45) Date of Patent: Jun. 18, 2019

(54) POWER SUPPLY CIRCUIT WITH CONVERTER CIRCUIT

(71) Applicant: SIGNIFY HOLDING B.V., Eindhoven (NL)

(72) Inventor: Zhi Quan Chen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/510,689

(22) PCT Filed: Aug. 27, 2015

(86) PCT No.: PCT/EP2015/069582
§ 371 (c)(1),
(2) Date: Mar. 12, 2017

(87) PCT Pub. No.: WO2016/037855
PCT Pub. Date: Mar. 17, 2016

(65) Prior Publication Data
US 2018/0234019 A1 Aug. 16, 2018

(30) Foreign Application Priority Data

Sep. 12, 2014 (WO) ................ PCT/CN2014/086396
Dec. 4, 2014 (EP) ..................... 14196190

(51) Int. Cl.
*H02M 3/335* (2006.01)
*H02M 1/36* (2007.01)
*H02M 1/00* (2006.01)

(52) U.S. Cl.
CPC ......... *H02M 3/33523* (2013.01); *H02M 1/36* (2013.01); *H02M 3/33553* (2013.01);
(Continued)

(58) Field of Classification Search
CPC . H02M 2001/0006; H02M 2001/0064; H02M 1/36; H02M 3/33523
See application file for complete search history.

(56) References Cited

U.S. PATENT DOCUMENTS

| 4,710,695 A | 12/1987 | Satoshi et al. |
| 4,862,338 A * | 8/1989 | Tanaka ................. H02M 3/338 363/19 |

(Continued)

FOREIGN PATENT DOCUMENTS

| CN | 201860494 U | 6/2011 |
| JP | H0530733 A | 2/1993 |

(Continued)

*Primary Examiner* — Jue Zhang
*Assistant Examiner* — David A. Singh
(74) *Attorney, Agent, or Firm* — Akarsh P. Belagodu (57) ABSTRACT

Presented is a converter circuit having main switching circuit on a primary side of a transformer, for controlling supply of a current to a storage inductor on the primary side when the main switching circuit is conductive. The convertor circuit comprises: a control circuit operatively coupled to the main switching circuit and for controlling the main switching circuit, the control circuit comprising a control capacitor adapted to enable the control circuit and turn off the main switching circuit; an auxiliary inductor magnetically coupled to the storage inductor and adapted to trigger the control circuit to operate and turn off the main switching circuit in response to a voltage change in the storage inductor when the main switching circuit being conductive; and a charging circuit coupled between the auxiliary inductor and the control capacitor and adapted to enable the auxiliary inductor to charge the control capacitor. The charging circuit comprises first and second charging paths within the primary side between the auxiliary inductor and the control capacitor, the first charging path being conductive and the second charging path being conductive when a (Continued)

voltage across the auxiliary inductor is above a threshold value.

14 Claims, 8 Drawing Sheets

(52) U.S. Cl.
CPC ............... *H02M 3/33569* (2013.01); *H02M 2001/0006* (2013.01); *H02M 2001/0064* (2013.01)

(56) References Cited

U.S. PATENT DOCUMENTS

| | | | | |
|---|---|---|---|---|
| 5,369,307 | A * | 11/1994 | Kobayashi | H02M 3/3385 307/125 |
| 5,995,385 | A | 11/1999 | Shimamura | |
| 6,046,920 | A | 4/2000 | Cazabat et al. | |
| 6,246,596 | B1 | 6/2001 | Yamazaki | |
| 6,445,598 | B1 | 9/2002 | Yamada | |
| 6,532,159 | B2 * | 3/2003 | Nishida | H02M 3/3385 363/21.14 |
| 8,027,176 | B2 * | 9/2011 | Nakai | H02M 3/33523 363/21.16 |
| 8,031,490 | B2 * | 10/2011 | Kitamura | H02M 3/3385 363/142 |
| 8,488,339 | B2 | 7/2013 | Marumo et al. | |
| 2001/0022733 | A1 * | 9/2001 | Schetters | H02M 3/3385 363/19 |
| 2001/0043265 | A1 | 11/2001 | Tetterington et al. | |
| 2010/0142230 | A1 | 6/2010 | Schroder | |
| 2012/0155137 | A1 * | 6/2012 | Simard | H02M 5/2573 363/126 |
| 2013/0038227 | A1 | 2/2013 | Yan et al. | |
| 2013/0194833 | A1 * | 8/2013 | Penberth | B41J 2/0452 363/21.04 |
| 2014/0160802 | A1 * | 6/2014 | Zhang | H02M 3/335 363/21.01 |
| 2015/0103568 | A1 * | 4/2015 | Del Carmen, Jr. | H02M 3/33507 363/21.16 |

FOREIGN PATENT DOCUMENTS

| | | |
|---|---|---|
| JP | H09266670 A | 10/1997 |
| WO | 2013166152 A1 | 11/2013 |

* cited by examiner

POWER SUPPLY CIRCUIT WITH CONVERTER CIRCUIT

CROSS-REFERENCE TO PRIOR APPLICATIONS

This application is the U.S. National Phase application under 35 U.S.C. § 371 of International Application No. PCT/EP2015/069582, filed on Aug. 27, 2015 which claims the benefit of Chinese Patent Application No. PCT/CN2014/086396, filed on Sep. 12, 2014 and European Patent Application No. 14196190.4, filed on Dec. 4, 2014. These applications are hereby incorporated by reference herein.

FIELD OF THE INVENTION

This invention relates to power supply circuits, and more particularly switching power supply circuits.

BACKGROUND OF THE INVENTION

Switching power supply circuits, including RCC circuits, are widely used as light emitting diode (LED) driver circuits and chargers for electronic devices because of their low cost.

Figure 1:
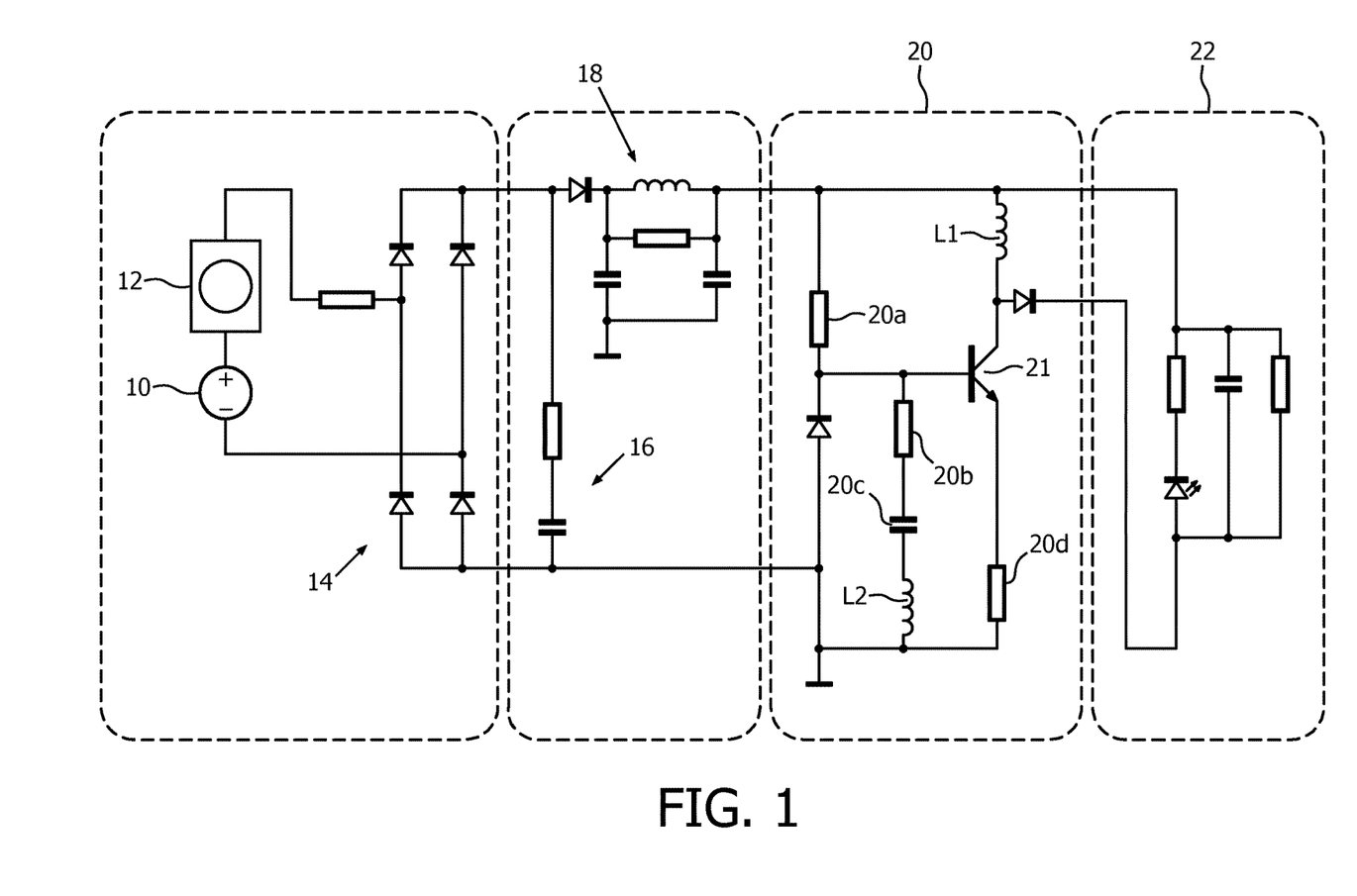
FIG. 1 shows a known LED driver circuit based on a RCC circuit.

A known RCC driver circuit for an LED light is shown in FIG. 1. This circuit consists of the mains supply, realized e.g. as a 230V mains voltage system 10 with a leading edge dimmer 12. An ordinary diode bridge rectifier 14 is followed by an RC latch 16 to damp high frequency oscillations/ringing. An EMI filter stage 18 supplies the RCC converter 20 with its dc operating supply.

The self-resonating RCC converter works typically in a buck-boost mode making use of two coupled coils L1, L2 to generate a feedback signal controlling the current to be fed to the LED source 22. The inductor L1 acts as an energy store and delivers current to the LED source 22 when the main switching transistor 21 is off. The coupled inductor L2 influences the biasing of the transistor base to provide the desired self-resonance. In a more detailed principle, when transistor 21 is off, power will flow via resistors 20a, 20b to charge capacitor 20c. When the capacitor 20c is charged to a certain level, the transistor 21 turns on, and current will flow via inductor L1, transistor 21 and a sense resistor 20d. The inductive voltage on the inductor L2 due to coupling with the inductor L1 makes the capacitor 20c discharge and in turn the transistor 21 will be turned off again.

RCC circuits are, however, not widely used in applications which require high performance. RCC circuit designs which produce a high power factor, a low total harmonic distortion (THD) and good line regulation at the same time are complex and difficult to design.

RCC circuits which achieve high power factor and low THD performance are known, but such circuits have poor line regulation (in that a varying input voltage significantly affects the output of the driver circuit). They may also exhibit reduced linearity and inadequate depth of dimming for LED light driving applications. Accordingly, driver circuits for LED typically rely on Pulse Width Modulation (PWM) and employ an Integrated Circuit (IC) control chip.

A prior U.S. Pat. No. 5,995,385 discloses an RCC circuit. Wherein there are two paths from an Auxiliary (AUX) winding to a control capacitor of the power switch. However one path is a purely primary side control path and the other path is a feedback loop controlled by the secondary winding. The other path is as a whole a secondary side feed loop, not a primary side control path.

US20100142230A1 discloses a switching power supply with a primary side winding L2, a secondary side winding L3, and an auxiliary winding L4. US20100142230A1 uses a sensing resistor R52 to sense the primary side power and to turn off the switch Q3; after that, it uses an auxiliary winding L4 to detect the demagnetization of the transformer and to turn on the switch Q3 again.

U.S. Pat. No. 6,246,596B1 discloses a similar solution, in which it uses a sensing resistor to turn off the switch. A tertiary winding 23 is for sensing the secondary side power and for turning the switch on again after the switch is off. One feedback path controlled by the secondary side is provided to turn the switch on again.

SUMMARY OF THE INVENTION

There is therefore a need for a low cost RCC circuit which avoids the use of an IC control chip and addresses the issues of reduced linearity, namely providing better line regulation. It is also preferable to provide a RCC circuit for driving an LED arrangement which exhibits improved dimming performance.

The invention is defined by the claims.

According to a first aspect of the invention, there is provided a convertor circuit having a main switching circuit on a primary side of a transformer, for controlling supply of a current to a storage inductor on the primary side, comprising: a control circuit operatively coupled to the main switching circuit and for controlling the main switching circuit, the control circuit comprising a control capacitor adapted to enable the control circuit and turn off the main switching circuit (Q4); an auxiliary inductor magnetically coupled to the storage inductor and adapted to trigger the control circuit to operate and turn off the main switching circuit in response to a voltage change in the storage inductor when the main switching circuit being conductive; and a charging circuit coupled between the auxiliary inductor and the control capacitor and adapted to enable the auxiliary inductor to charge the control capacitor, wherein the charging circuit comprises first and second charging paths within the primary side between the auxiliary inductor and the control capacitor, the first charging path being conductive and the second charging path being conductive when a voltage across the auxiliary inductor is above a threshold value.

A control circuit is employed which controls the main switching circuit of the convertor circuit. The control circuit is triggered to operate by an auxiliary inductor which is responsive to a change in voltage at the storage inductor. Thus, there is proposed the use of an auxiliary inductor to trigger the controlling of the main switching circuit. Two charging paths are arranged only within the primary side between the auxiliary inductor and a control capacitor which controls the action of the control circuit, in other words, these two charging paths are primary side control paths.

This proposed arrangement may enable the time constant, and in turn the time constant $T_{ON}$ of the RCC, namely the duration the main power switch is closed, to be adjusted flexibly and easily. The arrangement may also exhibit good line regulation. More specifically, the two charging paths are conductive under different conditions: one path is constantly conductive and the other path is conductive only when the voltage on the auxiliary inductor is big enough (e.g. above a predetermined threshold value). Thus, in the case of low input voltage, the inductive voltage on the auxiliary inductor is small, only one charging path is conductive, and the charging of the control capacitor results in a normal turn off of the power switch, namely a normal $T_{ON}$ and a certain power output of the converter. In the case of high input voltage, the inductive voltage on the auxiliary inductor is big, two charging paths are conductive, and the charging of the control capacitor is more and results in a faster turn off of the power switch, namely a shorter $T_{ON}$. However, since the input voltage is high, the faster turn off will result to the similar power output as that when the input voltage is low.

In one embodiment, the control circuit may comprise a controllable switch having its control terminal coupled to a ground terminal via the control capacitor, wherein the first charging path comprises a series connection of a resistance and capacitance between the control terminal of the controllable switch and the auxiliary inductor, and wherein the second charging path comprises a series connection of a resistance and a breakdown diode between the control terminal of the controllable switch and the auxiliary inductor. Such an embodiment provides more detailed implementations for the two charging paths. Specifically, detection that a voltage across the auxiliary inductor is above the threshold value is realized by the breakdown diode. This implementation is simple and the cost is low.

In one embodiment, the first charging path is adapted to increase its conductivity when said voltage across the auxiliary inductor is above a further threshold, and said first charging path further comprises: a diode in parallel with said resistance and said capacitance and forwarded from the auxiliary inductor to the control terminal of the controllable switch. Such an embodiment may further increase the capacity of controlling $T_{ON}$ of the converter according to the input voltage, thus achieving better line regulation.

In an embodiment, the charging circuit may comprise first and second discharging paths between the auxiliary inductor and the control capacitor for discharging the control capacitor. Wherein said first discharging path is conductive; and said second discharging path is conductive when a voltage across the control capacitor is above a limit value. Such an embodiment may provide an adaptive discharging of the control capacitor to ensure the time constant matches the charges in the control capacitor and guarantee the charges in the control capacitor are sufficiently discharged.

The first discharging path may comprise said resistance and capacitance of the first charging path, and wherein the second discharging path comprises: a path connected in parallel with said resistance and capacitance of the first discharging path, wherein said path comprises a further resistance and a further diode. This embodiment provides a detailed implementation for the two discharging paths. The one path can reuse one of the charging path to save component, and the other path uses a diode as a voltage detector to judge a voltage across the control capacitor is above a limit value.

Embodiments may therefore achieve good line regulation by using double charging path to charge and/or double discharging path discharge a control capacitor which controls the action of the control circuit (which in turn controls switching of the main switching circuit).

In another embodiment, the RCC circuit may further comprise a secondary side, with a secondary inductor coupled with said storage inductor, said secondary inductor being adapted to store energy via the coupling with the storage inductor when said main switching circuit is closed and to release said stored energy to a load terminal when said main switching circuit is open; a dimming circuit between said secondary inductor and said load terminal, adapted to receive a dimming signal and control the energy from the secondary inductor to said load terminal; and a feedback circuit for supplying the dimming signal on the secondary side to the control circuit via an optical coupler; and wherein said first and second charging paths are separated from the secondary side. Such an embodiment provides an additional feed-forward from the load side dimming signal to the control circuit of the converter. Thus the control circuit can be controlled further according to the dimming signal.

As discussed below with respect to further embodiments, for the case of an open load and very deep dimming, the optical coupler may act to provide the dimming signal and make the control circuit generate a very short $T_{ON}$ so as to minimize the energy converted by the converter. Embodiments may thus enable a reduction in flickering and enable deeper dimming to be achieved. Also, power loss may be reduced.

Embodiments may therefore facilitate deep dimming of LED-based lamps with very low flickering.

In a further embodiment, the feedback circuit may comprise a charging capacitance coupled to the control circuit; and a charging switch between said charging capacitance and said control capacitor, with a control terminal coupled to said optical coupler; said feedback circuit is adapted to close said charging switch when said dimming signal indicates a low dimming; thereby allowing said charging switch to supply charge to the control capacitor from the charging capacitance so as to accelerate charging of the control capacitor. The dimming signal may therefore be used for adjusting the control circuit, and this may be done via an opto-coupler. In deep dimming, the low level of the dimming signal may enable current from the charging capacitance to charge the control capacitor of the control circuit, thereby speeding up the charging and reducing the time between switching of the main switching circuit (i.e. reducing $T_{ON}$ of the RCC).

In a further embodiment, the charging capacitance of the feedback circuit may be further coupled to a control terminal of the main switching circuit and is adapted to provide a startup power to turn on said main switching circuit. Also, the feedback circuit is adapted to remove a bleed charge portion from said charging capacitance depending on the dimming signal, thereby delaying the turning on of the main switching circuit. Usually, at a dimmed state the drive circuit delivers too much power to the LEDs, resulting in rather high light output. In order to compensate for this, this embodiment bleeds the charging capacitor and delays the charging of it, the turn on the power switch is delayed, and less surplus power is delivered by the converter.

In a further embodiment, the RCC circuit may further comprise: a power supply side, with a power supply inductor coupled with said storage inductor, said power supply inductor being adapted to store energy via the coupling with the storage inductor when said main switching circuit is closed and to release said stored energy when said main switching circuit is open; wherein said feedback circuit is enabled by said power supply inductor (L5) and said optical coupler is coupled to the secondary inductor and powered thereby. Such an embodiment provides an open protection function. If the load is open, the power supply side and the secondary side will power the optical coupler, and the control circuit is in turn actuated to provide a very short Ton of the main switching circuit, reducing the energy converted from the primary side to the secondary side thus decrease the voltage on the opened load terminal.

When compared to conventional circuits, embodiments may allow even deeper dimming levels with even lower flickering. Also, since no IC control chip is employed, embodiments may offer cost benefit over a conventional switching power supply circuits.

Embodiments may not only be used in led lighting, but may also be useful for other applications, such as industry power supply, consumer electronics, etc.

An aspect of the invention also provides a lighting circuit, comprising: a RCC circuit according to an embodiment as discussed above; a latch and EMI filter circuit for generating the input signal to the RCC circuit; and an LED arrangement.

According to another aspect of the invention, there is provided a method of operating a convertor circuit having main switching circuit on a primary side for controlling supply of a current to a storage inductor on the primary side, comprising: controlling the main switching circuit with a control circuit by selectively enabling the control circuit with a control capacitor; using an auxiliary inductor to trigger the control circuit in response to a voltage change in the storage inductor; charging the control capacitor via a first charging path between the auxiliary inductor and the control capacitor; and charging the control capacitor via a second, different charging path between the auxiliary inductor and the control capacitor when a voltage across the auxiliary inductor is above a threshold value, wherein the first and second charging paths are primary side control path.

Embodiments may further comprise supplying a dimming signal for a load on a secondary side back to the control circuit via an optical coupler.

An embodiment of supplying a dimming signal may further comprise supplying charge from a charging capacitance coupled to the control circuit to the control capacitor so as to accelerate charging of the control capacitor.

In a further embodiment, controlling the main switching circuit further comprises turning on the main switching circuit by the charging capacitance, thereby the step of supplying charge from a charging capacitance to the control capacitor comprises removing a bleed portion from the charging capacitance and delaying the turning on of the main switching circuit.

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying drawings, in which.

DETAILED DESCRIPTION OF THE EMBODIMENTS

Proposed is a converter circuit which employs a control circuit for controlling the main switching circuit of the RCC circuit. The control circuit is triggered to operate by an auxiliary inductor which is responsive to a change in voltage at a storage inductor on the primary side of the RCC circuit. An auxiliary inductor is used to trigger the controlling of the main switching circuit, and two charging paths are arranged between the auxiliary inductor and a control capacitor which controls the action of the control circuit.

Thus, there is proposed a low cost converter circuit which does not use an IC control chip and also exhibits good linearity. The proposed arrangements may also enable the time constant $T_{ON}$ of the converter to be flexibly adjusted.

Embodiments may therefore be used for driving an LED arrangement and achieve a reduction in flickering. Embodiments may also enable deep LED dimming to be achieved. The following embodiment uses RCC (ring choke converter) as an example, but it should be understood the invention is not limited in RCC. Other types of self-oscillation converter, as long as it uses storage inductor and auxiliary inductor as defined above, are applicable.

Figure 2:
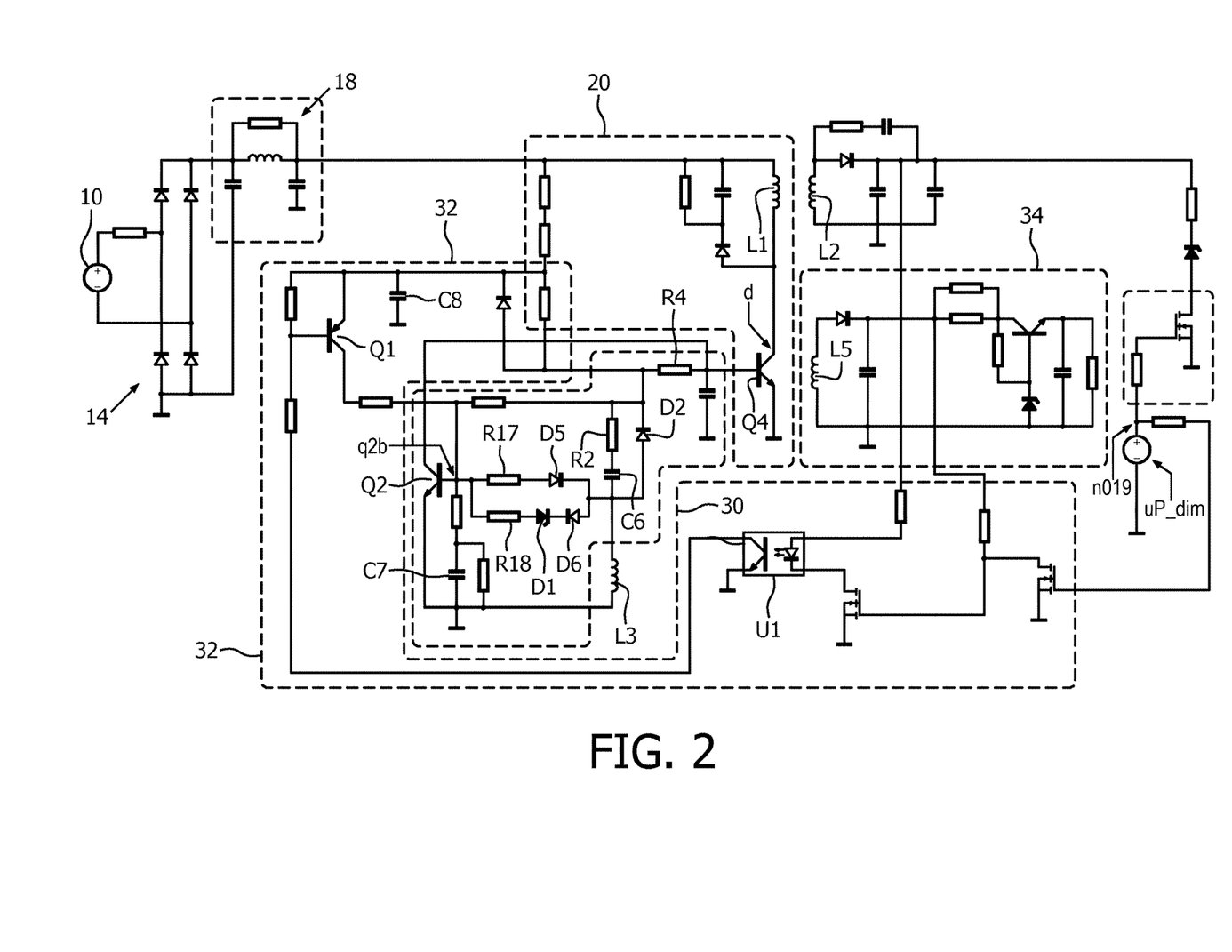
FIG. 2 shows a lighting circuit comprising a convertor circuit according to an embodiment.

A lighting circuit comprising a convertor circuit according to an embodiment is shown in FIG. 2. The convertor circuit has main switching circuit Q4 on a primary side for controlling supply of a current to a storage inductor L1 on the primary side.

Unlike the conventional circuit shown in FIG. 1, the embodiment of FIG. 2 comprises a control circuit 30 coupled to the main switching circuit Q4. The control circuit 30 is adapted to control the main switching circuit Q4.

The control circuit 30 comprises: a control capacitor C7 adapted to enable the control circuit; an auxiliary inductor L3 magnetically coupled to the storage inductor L1 and adapted to trigger the control circuit 30 to operate in response to a voltage change in the storage inductor L3; and a charging circuit coupled between the auxiliary inductor L3 and the control capacitor C7.

The charging circuit is adapted to enable the auxiliary inductor L3 to charge the control capacitor C7 and, for this purpose, the charging circuit comprises first and second charging paths between the auxiliary inductor L3 and the control capacitor C7. The first charging path is conductive and the second charging path is conductive when a voltage across the auxiliary inductor L3 is above a threshold value. Said two control paths are only in the primary side and serve as primary side control paths, without coupling to the secondary side and not serving as feedback paths.

Thus, the control circuit 30 is employed to control the main switching circuit Q4 of the convertor circuit. The control circuit 30 is triggered to operate by the auxiliary inductor L3 which is, it turn, responsive to a change in voltage at the storage inductor Q1. In other words, the auxiliary inductor L3 triggers the controlling of the main switching circuit Q4. Two charging paths are arranged between the auxiliary inductor and a control capacitor which controls the action of the control circuit.

More specifically, the two charging paths are arranged to be conductive under different conditions. A first path is constantly conductive and the second, other path is conductive only when the voltage on the auxiliary inductor L3 is big enough (e.g. above a predetermined threshold value). Thus, in the case of low input voltage, the inductive voltage on the auxiliary inductor is small, only one charging path is conductive, and the charging of the control capacitor results in a normal turn off of the power switch, namely a normal TON and a certain power output of the converter. In the case of high input voltage, the inductive voltage on the auxiliary inductor is big, two charging paths are conductive, and the charging of the control capacitor is more and results in a faster turn off of the power switch, namely a shorter TON. However, since the input voltage is high, the faster turn off will result to the similar power output as that when the input voltage is low.

Figure 3:
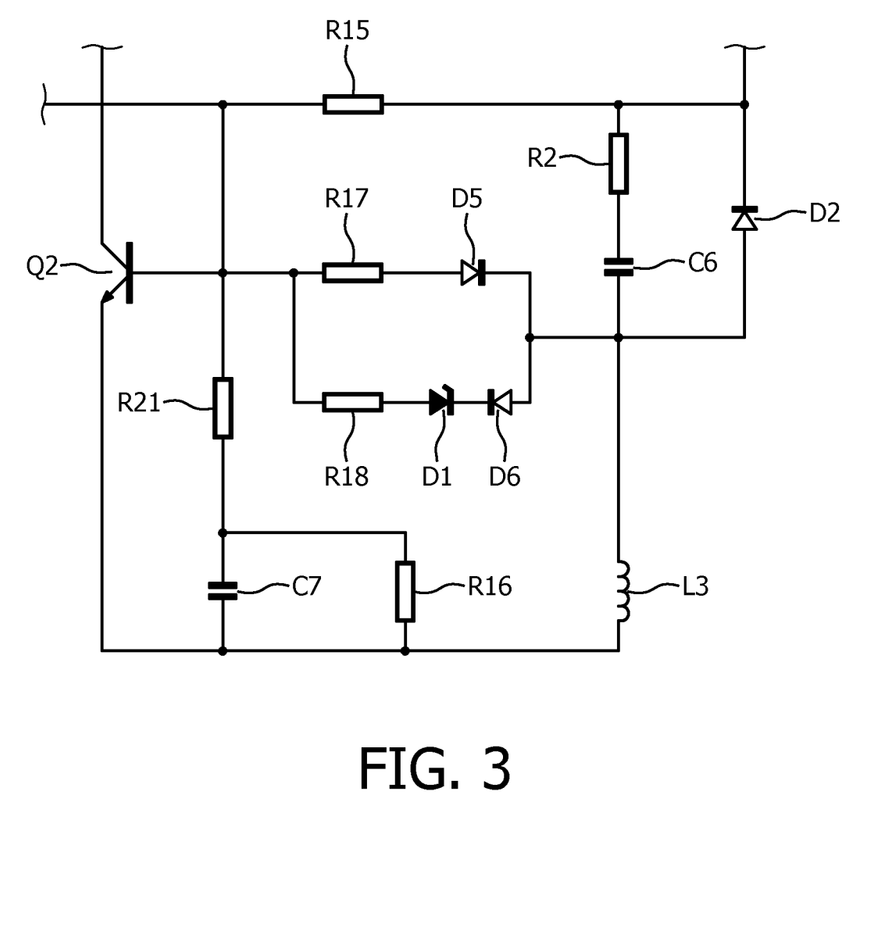
FIG. 3 shows the control circuit of the embodiment of FIG. 2 on its own (e.g. in isolation) for improved clarity.

Turning now to FIG. 3, the control circuit of the embodiment of FIG. 2 is shown on its own (e.g. in isolation) for improved clarity.

The control circuit 30 comprises: a control capacitor C7 adapted to enable the control circuit; an auxiliary inductor L3 coupled to the storage inductor L1 and adapted to trigger the control circuit 30 to operate in response to a voltage change in the storage inductor L3; and a charging circuit coupled between the auxiliary inductor L3 and the control capacitor C7. The charging circuit comprises first and second charging paths between the auxiliary inductor L3 and the control capacitor C7.

The control circuit 30 also comprises a controllable switch Q2 (e.g. a bipolar transistor) having its control terminal (e.g. its base) coupled to a ground terminal via the control capacitor C7. The collector of the switch Q2 connects to the base of the main switching circuit Q4 to draw base current therefrom and turn Q4 off when the switch Q2 is on. The first charging path comprises a series connection of a resistance R15 & R2 and capacitance C6 between the control terminal of the controllable switch Q2 and the auxiliary inductor L3. The second charging path comprises a series connection of a resistance R18 and a breakdown (e.g. Zener) diode D1 between the control terminal of the controllable switch Q2 and the auxiliary inductor L3.

Detection that a voltage across the auxiliary inductor L3 is above the threshold value is thus realized by the breakdown diode D1.

In a more detailed embodiment, though the first charging is conductive constantly, the first charging path is adapted to increase its conductivity when the voltage across the auxiliary inductor L3 is above a certain threshold. For this purpose, the first charging path further comprises: a diode D2 in parallel with the resistance R2 and capacitance C6 of the first charging path. This diode D2 is forwarded from the auxiliary inductor L3 to the control terminal of the controllable switch Q2. This charging path arrangement may further increase the capacity of controlling Ton of the converter according to the input voltage, thus achieving better line regulation.

For discharging the control capacitor C7, the charging circuit 30 also comprises first and second discharging paths between the auxiliary inductor L3 and the control capacitor C7. The first discharging path is arranged to be conductive, and the second discharging path is arranged to be conductive when a voltage across the control capacitor C7 is above a limit value. More specifically, the first discharging path comprises the resistance R2 and capacitance C6 of the first charging path, and the second discharging path comprises a path connected in parallel with the resistance R2 and capacitance C6 of the first discharging path and has a further resistance R17 and a further diode D5 connected in series. This arrangement re-uses one of the charging path to save components. It also uses a diode as a voltage detector to judge if voltage across the control capacitor C7 is above a limit value.

Figure 4:
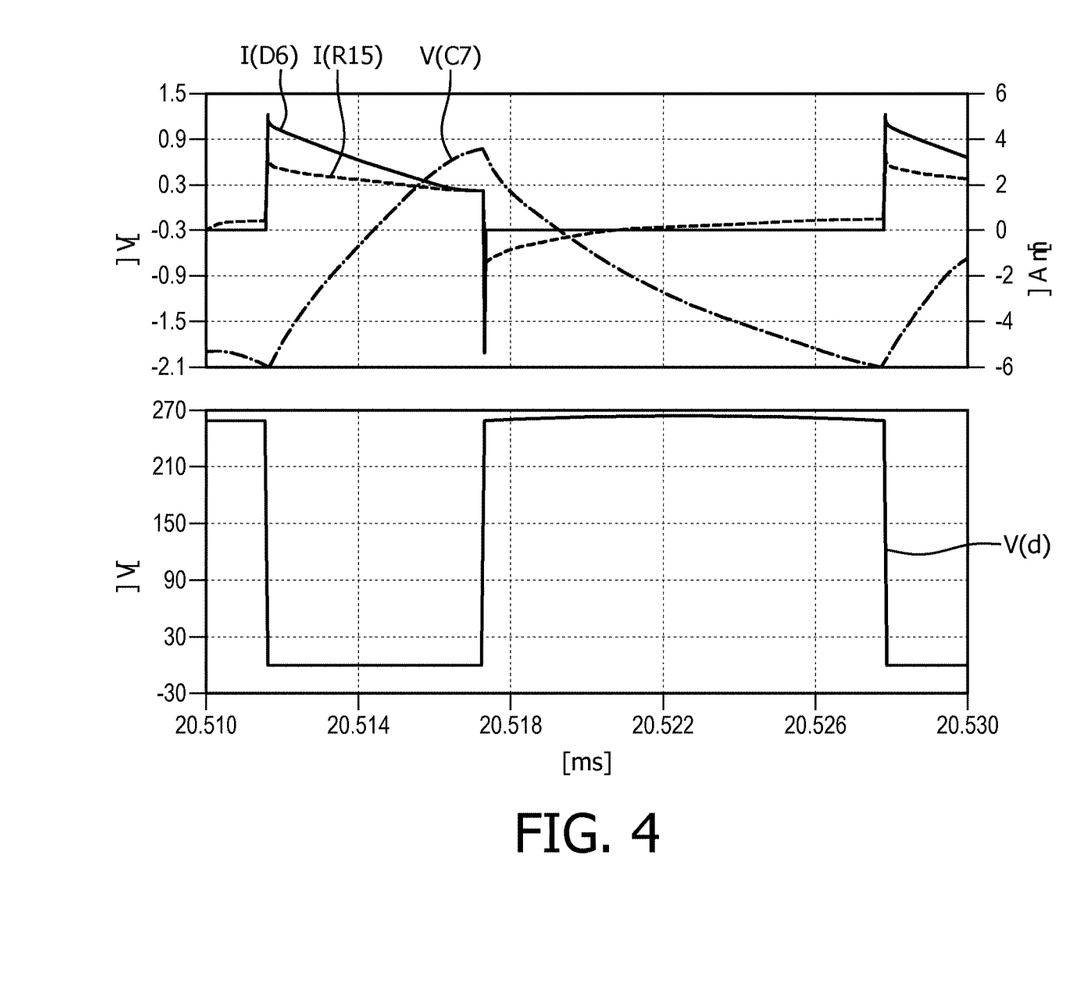
FIG. 4 shows example plots of signals in the charging circuit of FIGS. 2 and 3.

Turning to FIG. 4, there are shown plots of signals in the charging circuit 30 of FIGS. 2 and 3. The current in the diode D6 of the second charging path is shown as plot I(D6), and the current in the resistance R15 of the first charging path is shown as plot I(R15). The voltage at the control capacitor C7 is shown as plot V(C7) and the voltage at collector of the main switching circuit Q4, point d, is shown as plot V(d).

When the main switching circuit Q4 is conductive, the point d is pull down to ground as 0V, and power flows from the source to the storage inductor L1. Meanwhile the inductive voltage appears in the auxiliary winding L3, the first path is conductive and the current I(R15) occurs. Additionally, in the figure, when the input voltage exceed 90V lead to the inductive voltage in L3 reach 5.5V, the inductive voltage also makes the diode D1 break down. Current occurs in the second charging path, as shown in the amplitude above 2 mA in I(D6). It can clearly be observed that as the current in the diode D6 of the second charging path and the resistance R15 of the first charging path is positive, the voltage at the control capacitor C7 increases due to the charge supplied via the charging paths. The current slowly decreases during this charging period.

Once the voltage at the control capacitor C7 reaches approximately 0.8V, the base to emitter voltage of the control switch Q2 reaches the close threshold of Q2, and Q2 is close, turning the main switching circuit Q4 off. At this moment, the point d at the collector of the Q4 is pull up to the input voltage as nearly 270V. The control capacitor C7 is discharged via R15 and R2 thus the current I(R15) is negative. The control capacitor C7 discharges to the level where it voltage is approximately −2.1V. At this moment the main switching circuit Q4 is conductive again. The voltage at point d of Q4 drops to 0 v. Inductive voltage appears in the inductor L3 and the positive current flows in the diode D6 of the second charging path and the resistance R15 of the first charging path, thereby charging the control capacitor C7 once again. This cycle of charging and discharging repeatedly occurs.

It can be understood that the conducting of the second charging path will influence the charging rate of the control capacitor C7, and the charging rate of C7 influence when the control switch Q2 turns off the main switching circuit Q4. In the above embodiment, the second charging path is conductive when the input voltage exceeds 90V lead to the inductive voltage in L3 reach 5.5V.

It will be appreciated that the control circuit 30 of the illustrated embodiments employs double charging and discharging paths to charge/discharge a control capacitor C7 which controls the action of the control circuit. This may achieve good line regulation, as is demonstrated by the plots of FIG. 5.

Figure 5:
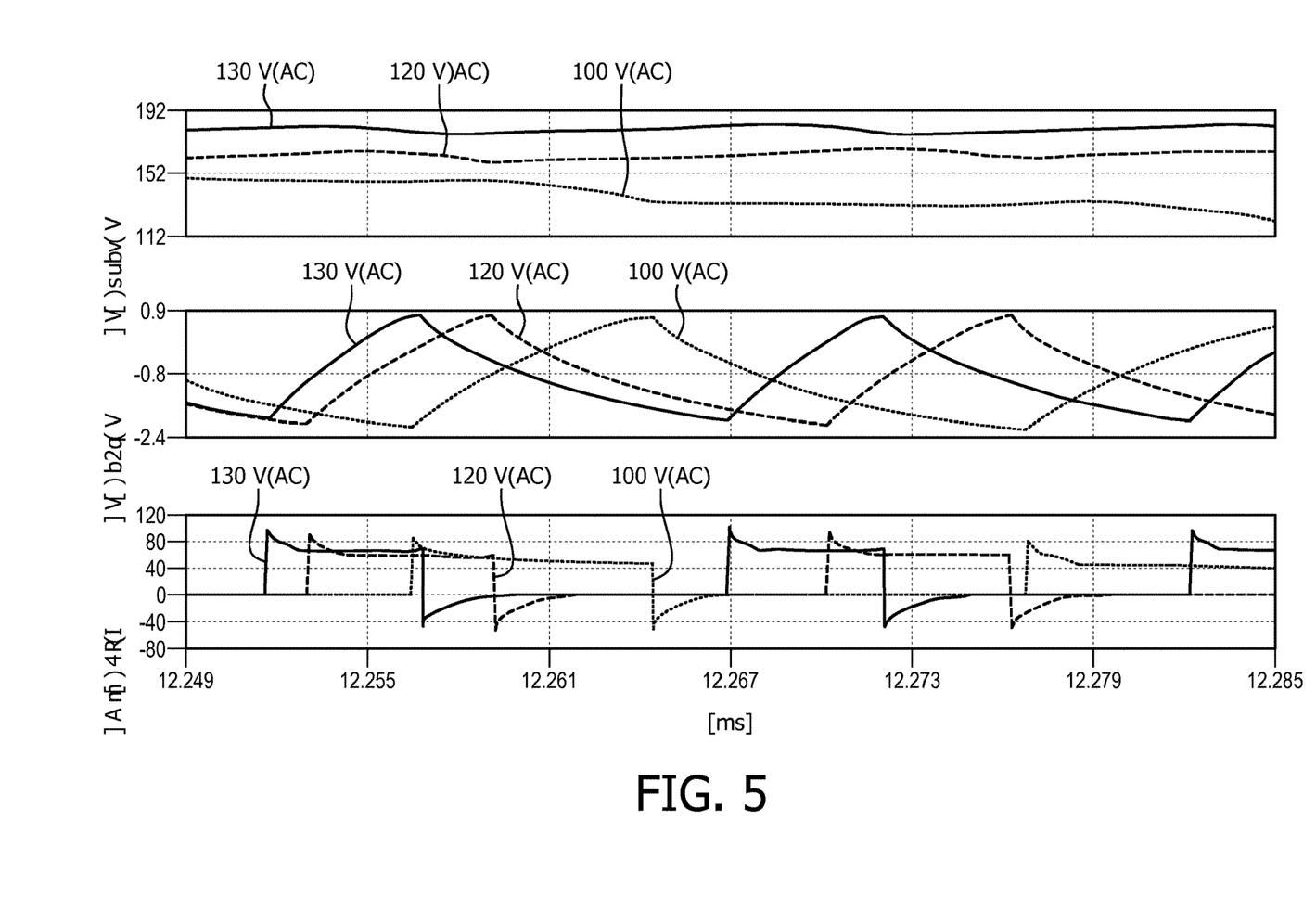
FIG. 5 comprises graphs showing plots of signals in the convertor circuit of FIG. 2 at various bus voltages.

FIG. 5 comprises three graphs each showing plots of a signal in the convertor circuit of FIG. 2 at various bus voltages (130V, 120V and 100V (AC)). The first (top) graph shows the variation of bus voltage V(vbus) over time for voltages 130V, 120V and 100V (AC). The second (middle) graph shows the variation of voltage at the control terminal (e.g. base) of the controllable switch Q2 over time for bus voltages 130V, 120V and 100V (AC). The third (bottom) graph shows the variation of current in a resistance R4 at the control terminal of the main switching circuit Q4 over time for bus voltages 130V, 120V and 100V (AC). It can be seen that the charging time of the control capacitor as well as the Ton duration of 130V is shorter than those of 120V, and those of 120V is shorter than 100V. From FIG. 5, it can clearly be understood that the embodiment exhibits good line regulation since higher input voltage powers the converter for a shorter duration.

Referring now back to FIG. 2, the convertor circuit further comprises a secondary side, with a secondary inductor L2 coupled with the storage inductor L1. The secondary inductor L2 is adapted to store energy via the coupling with the storage inductor L1 when the main switching circuit Q4 is closed and to release energy to a load terminal when the main switching circuit Q4 is open. This type is a flyback type converter. It should be understood that this invention is not limited to flyback type. Other types such as buck boost is also applicable.

A dimming circuit is provided between the secondary inductor L2 and the said load terminal. The dimming circuit is adapted to receive a dimming signal and control the energy from the secondary inductor L2 to the load terminal. As illustrated in FIG. 2, the dimming circuit comprises the MOSFET switch M1 between the LED and the ground, and the voltage source generating the PWM dimming signal uP_dim to the gate of the MOSFET M1. The duty cycle of the dimming signal determines how long the MOSFET switch M1 is closed to light the LED thus controls the dimming level.

There is also provided a feedback circuit 32 for supplying the dimming signal on the secondary side to the control circuit 30 via an optical coupler U1. Thus, there is provided an additional feed-forward from the load side dimming signal to the control circuit 30. The control circuit 30 can therefore be controlled further according to the dimming signal.

In the embodiment of FIG. 2, the feedback circuit 32 comprises a charging capacitance C8 coupled between ground and the control circuit 30. The feedback circuit 32 also comprises a charging (e.g. bipolar) switch Q1 between the charging capacitance C8 and the control capacitor C7 of the control circuit 30. The control terminal (e.g. the base) of the charging switch Q1 is coupled to the optical coupler U1.

Figure 6:
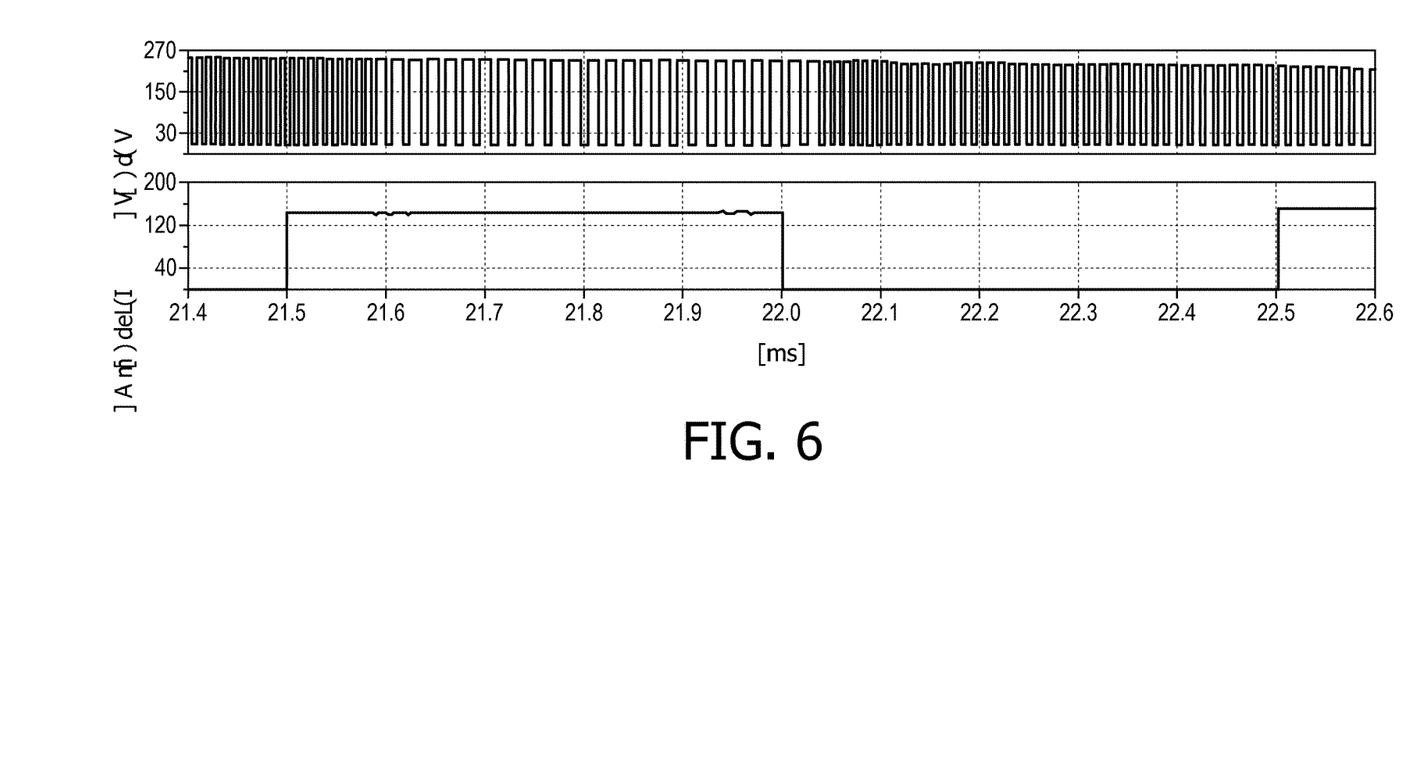
FIG. 6 comprises first and second exemplary plots of the voltage at point d and LED current (which corresponds to the dimming signal), respectively, for the convertor circuit of FIG. 2.

The feedback circuit is adapted to close the charging switch Q1 when the dimming signal indicates a low dimming level, thereby allowing the charging switch Q1 to supply charge to the control capacitor C7 of the control circuit 30 so as to accelerate charging of the control capacitor Q2. More specifically, if the dimming signal is low level, M3 is off, M2 is on, U1 is on and Q1 is on, and the capacitor C8 would charge capacitor C7. Otherwise if the dimming signal is high level, M3 is on and M2 and U1 are off, and Q1 is off, and the capacitor C8 would not charge capacitor C7. As shown in FIG. 6, the top plot is the voltage at point d (labelled as V(d)) and the bottom plot is the LED current (labelled as I(Led1)) which corresponds to the dimming signal. When the dimming signal is low, the capacitor C7 will be charged more quickly as discussed above, resulting a more frequent switching of the main switching circuit and less power converted from the primary side to the secondary side, thereby further dimming down the load. Therefore if the duty cycle is reduced even more, even less power is converted. It should be understood there is some offset therebetween and this is due to the hysteresis of the circuit.

It will therefore be understood that that, via the optocoupler U1 of the feedback circuit 32, the dimming signal may be used for adjusting the control circuit 30. In deep dimming, the low level of the dimming signal may enable current from the charging capacitance C8 to charge the control capacitor C7 of the control circuit 30, thereby speeding up the charging and reducing the time between switching of the main switching circuit Q4 (i.e. reducing $T_{ON}$ of the convertor circuit).

Figure 7:
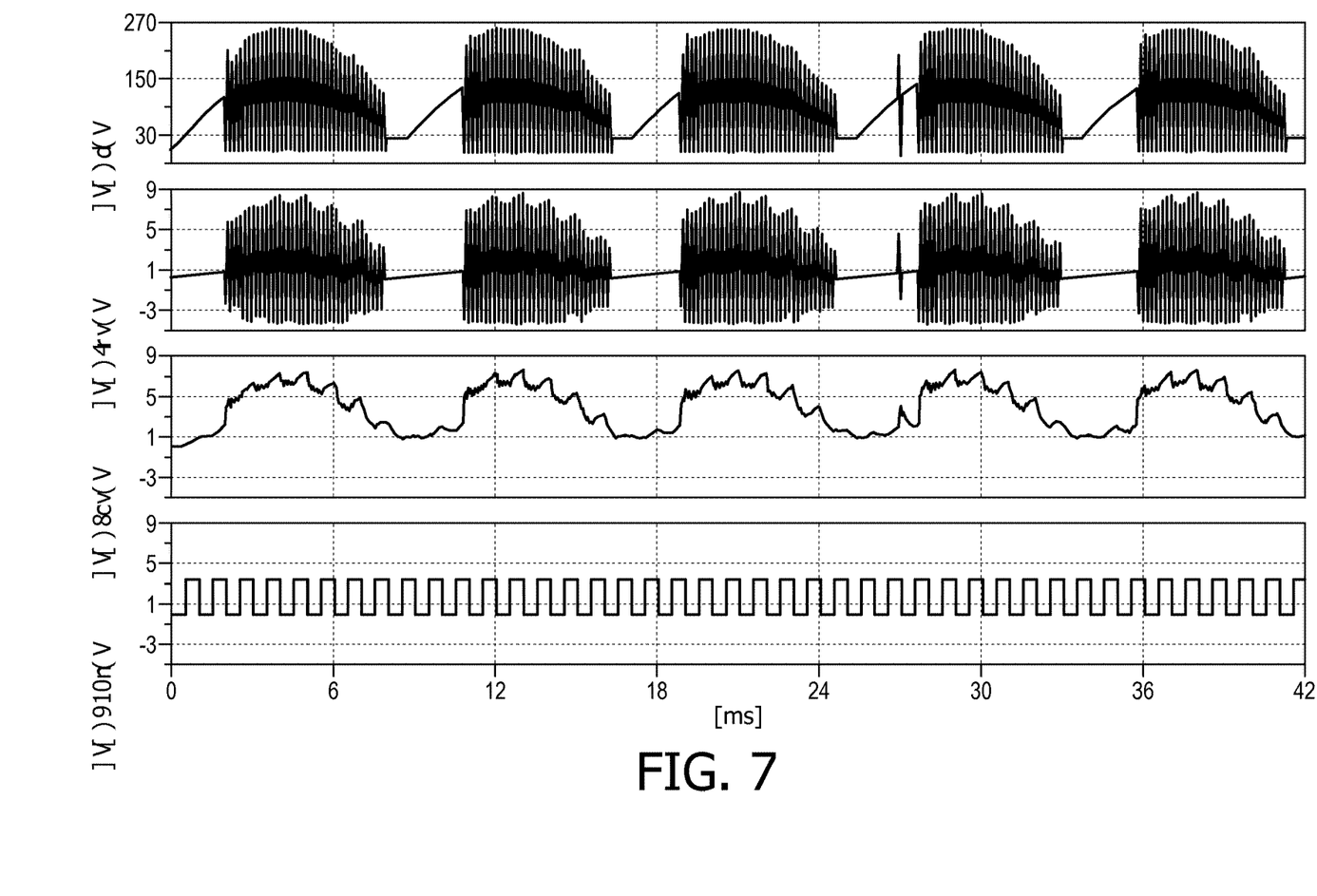
FIG. 7. shows first and second exemplary plots of the envelope wave of the voltage at point d and the voltage on resistor R4, respectively, for the convertor circuit of FIG. 2.

Further, the charging capacitance C8 of the feedback circuit is coupled to the control terminal (e.g. base) of the main switching circuit Q4 and adapted to provide a startup power to turn on the main switching circuit Q4. More specifically, the charging capacitance C8 is coupled to the bus voltage output from the EMI filter 18 via resistor R8 and R6. A further function of the above circuit is removing a bleed charge portion from the charging capacitance C8 depending on the dimming signal. Thus, the charge accumulation on the charging capacitance C8 is delayed before it reaches a voltage that can turn the main switching circuit Q4 on. This is shown in FIG. 7. The envelop wave of the top plot in FIG. 7 is the voltage at point d (labelled as V(d)), and the envelop wave of the bottom plot in FIG. 7 is the voltage on resistor R4 (labeled as V(vr4)). It can be seen that the main switching circuit starts to turn on/off when the input voltage is above 150V and is stopped when the input voltage drops below about 120V. This is because the charging capacitance C8 cannot accumulate enough charge to turn on the main switching circuit when the input voltage is low, due to that the charge on charging capacitance C8 is bleed away.

Figure 8:
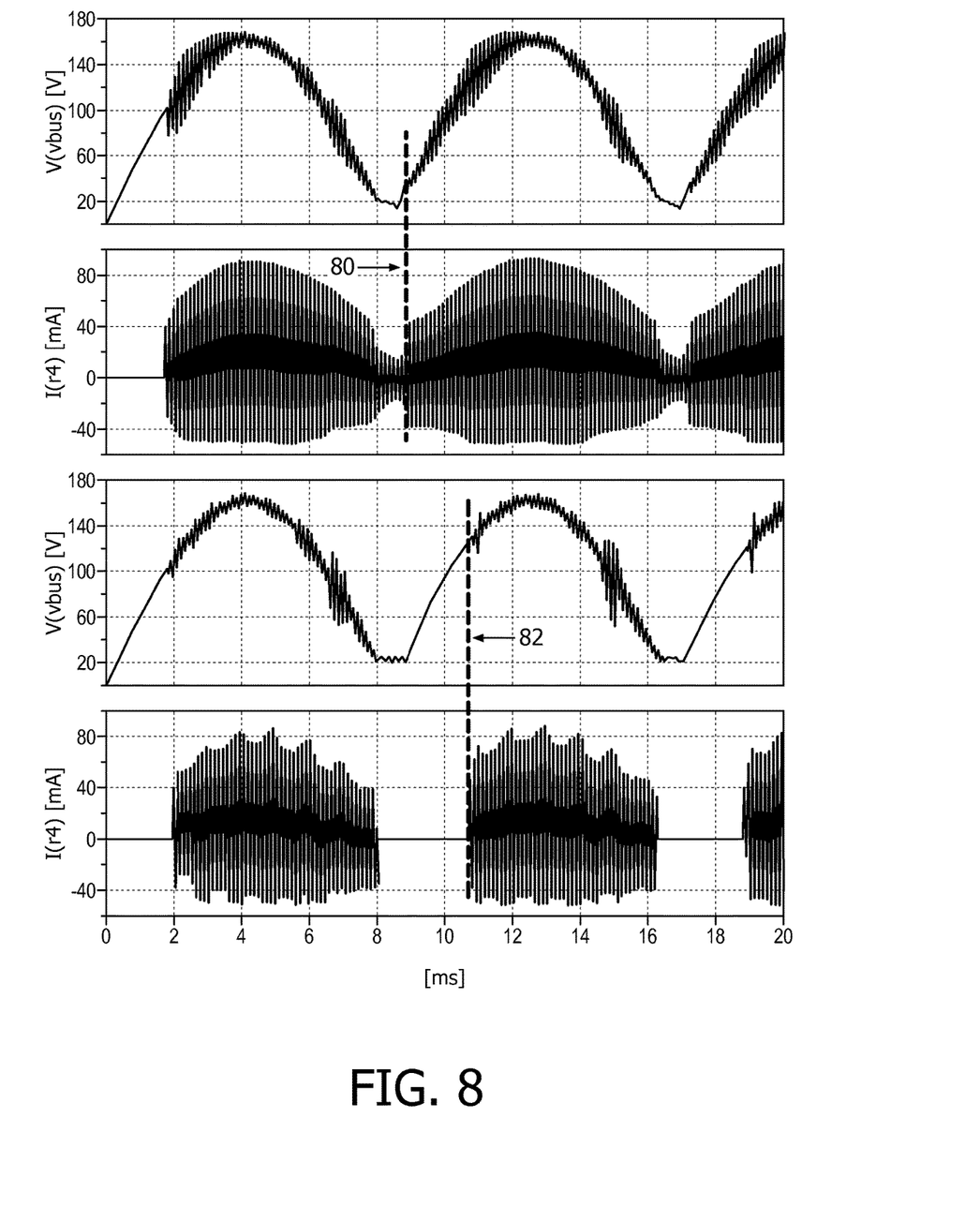
FIG. 8 illustrates a comparison between no dimming and dimming comprising first and second plots of the voltage on the bus and the current at resistor R4, respectively, for the convertor circuit of FIG. 2.

FIG. 8 shows a comparison between no dimming and dimming. The top plot of FIG. 8 is the voltage on the bus (labeled as V(vbus)). The bottom plot if FIG. 8 is the current at resistor R4 (labeled as I(r4)). Reference sign 80 indicates the start of the converter when no dimming and reference sign 82 indicates the start of the converter when dimming. The wave can be deemed as partly cut off. Thus even less energy is converted and more deep dimming can be achieved.

In the convertor circuit of FIG. 2, there is also provided a power supply circuit 34. The power supply circuit 34 comprises a power supply inductor L5 coupled with the storage inductor L2. The power supply inductor L5 is adapted to store energy via the coupling with the storage inductor when said main switching circuit is closed and to release said stored energy when said main switching circuit is open; wherein said feedback circuit is enabled by said power supply inductor L5 and said optical coupler is coupled to the secondary inductor and powered thereby. Such an embodiment provides an open protection function. If the load is open, the power supply side and the secondary side will power the optical coupler U1, and the control circuit 30 is in turn actuated to provide a very short $T_{ON}$ of the main switching circuit, reducing the energy converted from the primary side to the secondary side thus decreasing the voltage on the opened load terminal. At this time, the dissipation of system circuit is lower than 0.5 W as it works in Clearance oscillation mode and without extra power supply for dimming control circuit.

Embodiments may be used in all dimmable (but also non-dimmable) light sources based on LED or OLED (and PLED, AMOLED etc.). Further, LED-based lamps with different dim tones can be extended by the proposed method and circuit(s) in order to vary the current distribution between warm white LEDs and cold white LEDs. In addition, usage is also possible in other conventional lamps such as e.g. incandescent or fluorescent/gas discharge lamps where the driver of the lamps delivers more power as required by a lamp to reduce its output power (light).

Other variations to the disclosed embodiments can be understood and effected by those skilled in the art in practicing the claimed invention, from a study of the drawings, the disclosure, and the appended claims. For example, the above main switching circuit and control switch can be implemented by MOSFET alternatively. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A converter circuit having a main switching circuit on a primary side of a transformer, for controlling supply of a current to a storage inductor on the primary side when the main switching circuit is conductive, comprising:
   a control circuit operatively coupled to the main switching circuit and for controlling the main switching circuit, the control circuit comprising a control capacitor adapted to enable the control circuit and turn off the main switching circuit, the control circuit comprising a controllable switch;
   an auxiliary inductor magnetically coupled to the storage inductor and adapted to trigger the control circuit to operate and turn off the main switching circuit, in response to a voltage change in the storage inductor when the main switching circuit being conductive; and
   a charging circuit coupled between the auxiliary inductor and the control capacitor and adapted to enable the auxiliary inductor to charge the control capacitor,
   wherein the charging circuit comprises first and second charging paths within the primary side between the auxiliary inductor and the control capacitor, the first charging path being conductive and the second charging path comprising a series connection with a breakdown diode between the controllable switch and the auxiliary inductor, the second charging path being conductive when a voltage across the auxiliary inductor is above a threshold value.

2. The converter circuit of claim 1, wherein the controllable switch has a control terminal coupled to a ground terminal via the control capacitor,
   wherein the first charging path comprises a series connection of a resistance and capacitance between the control terminal of the controllable switch and the auxiliary inductor,
   and wherein the second charging path comprises a series connection of a resistance and the breakdown diode between the control terminal of the controllable switch and the auxiliary inductor.

3. The converter circuit of claim 2, wherein the first charging path is adapted to increase its conductivity when said voltage across the auxiliary inductor is above a further threshold value,
   and wherein said first charging path further comprises:
   a diode in parallel with said resistance and said capacitance and forwarded from the auxiliary inductor to the control terminal of the controllable switch.

4. The converter circuit of claim 1, wherein the charging circuit further comprises first and second discharging paths between the auxiliary inductor and the control capacitor for discharging the control capacitor;
   wherein said first discharging path is conductive; and
   said second discharging path is conductive when a voltage across the control capacitor is above a limit value.

5. The converter circuit of claim 4, wherein the first discharging path comprises said resistance and capacitance of the first charging path, and wherein the second discharging path comprises: a path connected in parallel with said resistance and capacitance of the first discharging path, and wherein said second discharging path comprises a further resistance and a further diode.

6. The converter circuit of claim 1, further comprising:
   a secondary side, with a secondary inductor coupled with said storage inductor, said secondary inductor being adapted to store energy via the coupling with the storage inductor when said main switching circuit is closed and to release said stored energy to a load terminal when said main switching circuit is open;
   a dimming circuit between said secondary inductor and said load terminal, adapted to receive a dimming signal and control the energy from the secondary inductor to said load terminal; and
   a feedback circuit for supplying said dimming signal on the secondary side to the control circuit via an optical coupler; and
   wherein said first and second charging paths are separated from the secondary side.

7. The converter circuit of claim 6, wherein the feedback circuit further comprises:
   a charging capacitance coupled to the control circuit;
   a charging switch between said charging capacitance and said control capacitor, with a control terminal coupled to said optical coupler;
   said feedback circuit is adapted to close said charging switch when said dimming signal indicates a low dimming; thereby allowing said charging switch to supply charge to the control capacitor from the charging capacitance, so as to accelerate charging of the control capacitor.

8. The converter circuit of claim 7, wherein the charging capacitance of the feedback circuit is further coupled to a control terminal of the main switching circuit and adapted to provide a startup power to turn on said main switching circuit; and wherein
   said feedback circuit is adapted to remove a bleed charge portion from said charging capacitance depending on the dimming signal, thereby delaying the turning on of the main switching circuit.

9. The converter circuit of claim 6, further comprising:
   a power supply side, with a power supply inductor coupled with said storage inductor, said power supply inductor being adapted to store energy via the coupling with the storage inductor when said main switching circuit is closed and to release said stored energy when said main switching circuit is open;
   wherein said feedback circuit is enabled by said power supply inductor and said optical coupler is coupled to the secondary inductor and powered thereby.

10. A lighting circuit, comprising:
    a converter circuit as claimed in claim 1;
    a latch and EMI filter circuit for generating the input signal to the converter circuit; and
    an LED arrangement.

11. A method of operating a convertor circuit having main switching circuit on a primary side of a transformer, for controlling supply of a current to a storage inductor on the primary side when the main switching circuit is conductive, comprising:
    controlling the main switching circuit with a control circuit by selectively enabling the control circuit with a control capacitor adapted to turn off the main switching circuit, wherein the control circuit comprises a controllable switch;
    using an auxiliary inductor to trigger the control circuit in response to a voltage change in the storage inductor;

charging the control capacitor via a first charging path between the auxiliary inductor and the control capacitor to turn off the main switching circuit; and charging the control capacitor via a second, different charging path between the auxiliary inductor and the control capacitor to turn off the main switching circuit, when a voltage across the auxiliary inductor is above the threshold value wherein the second charging path comprises a series connection with a breakdown diode between the controllable switch and the auxiliary inductor;

wherein the first and second charging paths are primary side control paths.

12. The method of claim 11, further comprising:

supplying a dimming signal for a load on a secondary side back to the control circuit via an optical coupler.

13. The method of claim 11, further comprising:

supplying charge from a charging capacitance coupled to the control circuit to the control capacitor so as to accelerate charging of the control capacitor.

14. The method of claim 11, wherein controlling the main switching circuit further comprises turning on the main switching circuit by the charging capacitance, thereby the step of supplying charge from a charging capacitance to the control capacitor comprises removing a bleed portion from the charging capacitance and delaying the turning on of the main switching circuit.

* * * * *